United States Patent [19]
Mahan

[11] 3,753,185
[45] Aug. 14, 1973

[54] METAL DETECTOR SEARCH COIL
[76] Inventor: William A. Mahan, P.O. Box 451, Dallas, Tex. 75040
[22] Filed: Dec. 5, 1972
[21] Appl. No.: 312,286

[52] U.S. Cl.......................... 336/84, 324/3, 324/41, 336/92, 336/229
[51] Int. Cl.......................... H01f 15/04, H01f 27/02
[58] Field of Search ................. 336/84, 90, 92, 229, 336/232, 66; 324/41, 3

[56] References Cited
UNITED STATES PATENTS
| | | | |
|---|---|---|---|
| 3,662,255 | 5/1972 | Garrett | 324/3 |
| 3,634,798 | 1/1972 | Astleford, Jr. | 336/92 |
| 3,266,000 | 8/1966 | Markarian | 336/229 |
| 3,237,137 | 2/1966 | Flaminio | 336/229 X |

Primary Examiner—Thomas J. Kozma
Attorney—Peter J. Murphy et al.

[57] ABSTRACT

A device for detecting metal articles buried beneath the surface for example, includes a search coil at one end of a handle, with the handle carrying the detector circuit components. The search coil is an induction coil enclosed within an annular chamber formed from a plastic housing having the form of a spoked wheel for example, and which is formed from two mating housing halves joined in the plane of the coil chamber. The coil is made up of a number of turns of insulated wire wherein the insulation material has a low coefficient of thermal expansion, with the coil being sheathed in metal foil to provide a Faraday shield. The coil is supported within the housing annular chamber on pads of foam rubber-like material which yieldingly supports and restrains the coil within the housing annular chamber.

11 Claims, 7 Drawing Figures

Patented Aug. 14, 1973
3,753,185
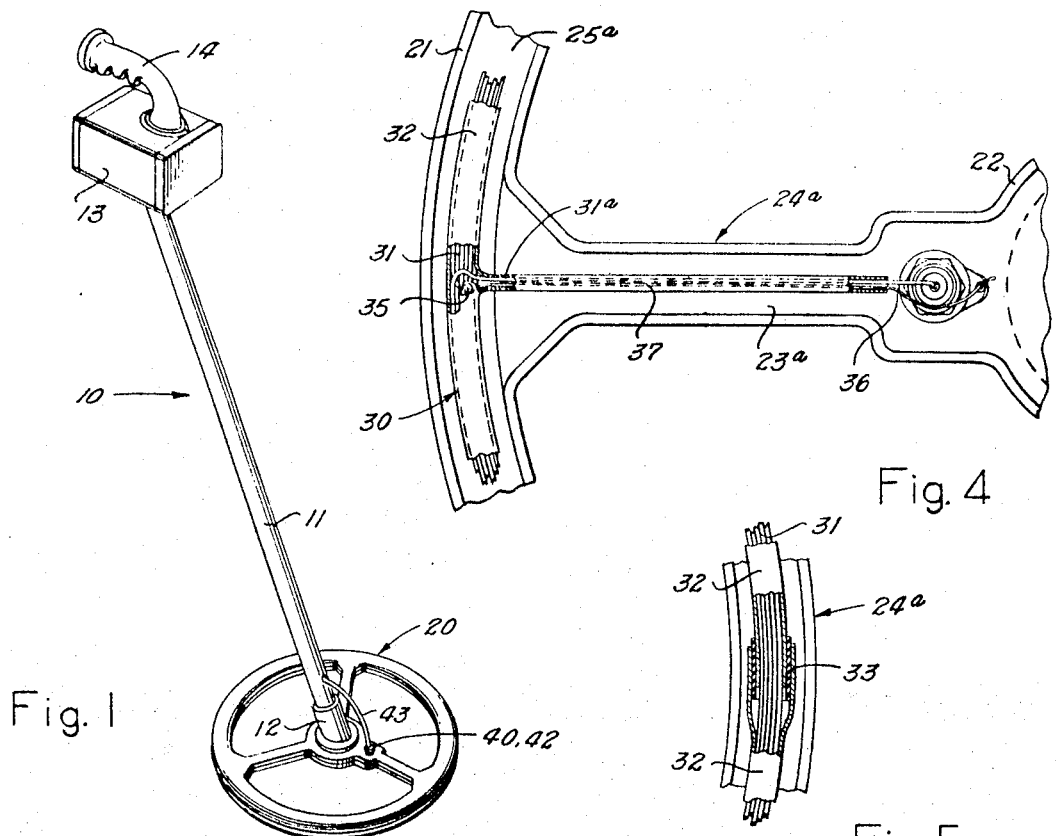
Fig. 1
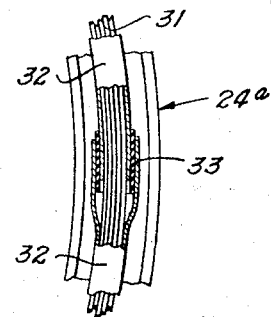
Fig. 4
Fig. 5
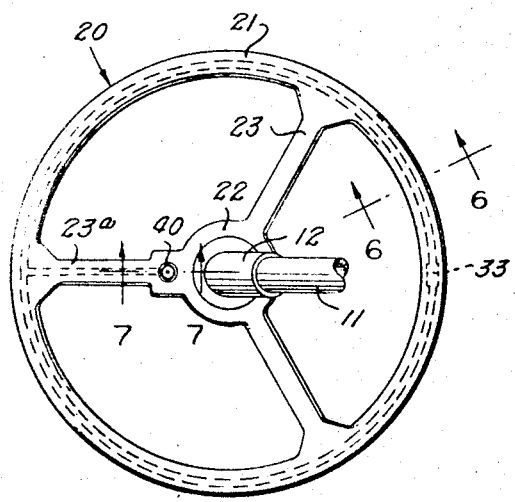
Fig. 2
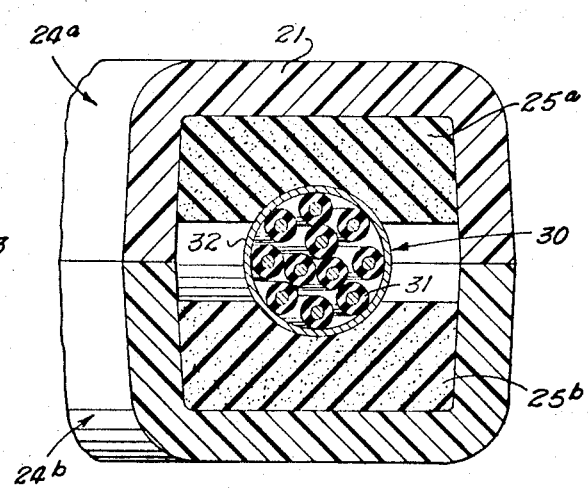
Fig. 6
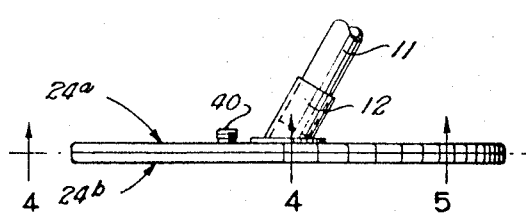
Fig. 3
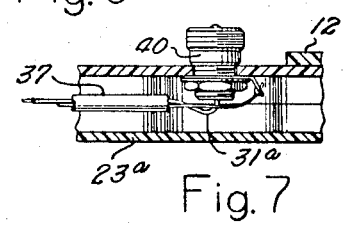
Fig. 7

METAL DETECTOR SEARCH COIL

BACKGROUND AND SUMMARY OF THE INVENTION

This invention relates to devices for locating metal objects buried in the ground for example; and more particularly to a search coil structure for such device to be passed in close proximity to the ground surface or other surface which is the subject of the search.

In devices of this kind, the search coil is an induction coil which is connected in an oscillator circuit in a manner that the oscillator frequency will vary with a change in inductance of the coil resulting from proximity of metal objects, with the change of frequency being detected to produce a signal indicating the presence of such metal objects.

It has been found that the frequency of the oscillator circuit in which the search coil is connected will change or drift in response to certain physical changes in the inductor coil structure; and this frequency drift necessarily produces signals in the detector which are false signals in the sense that they are not responsive to the presence of metal articles. Such false signals, of course, would greatly reduce the reliability of the detector device.

It has been observed that such false signals are produced by changes in the physical relation of the several turns of wire which make up the inductor coil, for example, and also by compressive forces acting on one or more of the turns of wire making up the inductor coil. It has further been observed that pressure forces acting on the turns of wire in the coil result from the manner in which the inductor coil is mounted within an enclosing housing. In some detector search coils, the turns of wire forming the inductor coil are tightly encased within a housing structure which may be built up by forming a plastic housing around the inductor coil, for example; or the coil may be enclosed within a hollow housing which is then filled with a plastic material to closely encase the wire coil. In these cases, where the detector search coil housing and associated structure becomes heated in use, due to direct sunlight and heat radiation from the ground for example, the housing structure itself and the wire insulation may expand due to thermal expansion resulting in increase of pressure on the coil turns resulting in an error signal. Similarly, as a result of thermal expansion, the search coil housing may seek to expand or radially enlarge to a greater extent than the coil wires and associated insulation resulting in forces acting on the coil wires to produce a false signal.

With other types of coil mounting within the coil housing, the relative movement caused by thermal expansion changes the relative position of the coil wires to produce false signals. Another cause of relative wire movement or distortion of coil arrangement may be the softening of the wire insulation, such as vinyl insulation, due to temperature increase.

It is a principal object of this invention then to provide a search coil structure wherein the inductor coil turns are supported in a housing in a manner to minimize external physical forces acting on the wire turns which would tend to produce frequency drift and resultant false signals.

It is another object of this invention to provide a search coil structure wherein the entire assembly can be manufactured readily and economically.

It is a further object of this invention to provide a search coil structure for use with a metal detector to produce a reliable device which is not subject to false signals due to changes in the ambient temperature.

These objects are accomplished in a search coil structure comprising a flat housing which defines an annular chamber having bottom and top walls. An induction coil, formed from a plurality of turns of insulated wire, is disposed within the annular chamber, with the turns being further enclosed within a sheath to form an annular coil unit. Cushioning support pads are disposed in confronting relation within the annular housing chamber, contiguous to the bottom and top walls, with the confronting faces being spaced a distance less than the diameter of the sheath coil unit. The coil unit is supported between these support pads in spaced relation to the housing chamber walls.

More particularly the support pads may be fabricated from a foam rubber type material and are annular and coextensive with the walls of the housing chamber. The sheath may be fabricated of metal foil to define a Faraday shield. The turns of wire are preferably insulated with a material having a low coefficient of thermal expansion.

The novel features and advantages of the invention, as well as additional objects thereof will be understood more fully from the following description when read in connection with the accompanying drawing.

DRAWING

FIG. 1 is a perspective view of a metal detector device having a search coil structure according to the present invention;

FIG. 2 is a plan view of the search coil housing;

FIG. 3 is a side elevation view of the search coil housing of FIG. 2;

FIG. 4 is a fragmentary view of the search coil housing and associated inductor coil structure as viewed in the plane 4—4 of FIG. 3;

FIG. 5 is a fragmentary view of a portion of the search coil structure as viewed in the plane 5—5 of FIG. 3;

FIG. 6 is a transverse sectional view of the housing annular chamber and search coil structure, as viewed in the plane 6—6 of FIG. 2; and FIG. 7 is a fragmentary sectional view of the search coil housing as viewed in the plane 7—7 of FIG. 2.

DESCRIPTION OF THE PREFERRED EMBODIMENT

FIG. 1 of the drawing is a perspective view of a metal detector 10 having a search coil structure 20 according to the present invention. A detector includes a supporting shaft or handle 11 which is secured to the search coil 20 by means of a flanged socket 12 suitably secured to the search coil housing, and which has a recess for receiving the lower end of the handle 11 which is in turn retained in the socket by any suitable means. A circuit housing 13 is attached to the handle adjacent to its upper end and contains the major portion of the circuitry and controls for operating the detector 10. The handle 11 projecting upward from the circuit housing is provided with a handle grip 14 for convenience in manipulating the detector.

The search coil structure is enclosed in a housing which is illustrated as having the form of a spoked wheel including a rim portion 21, a central hub portion 22 and three interconnecting spokes 24. While this wheel configuration may be preferable for search coils of larger diameter in order to minimize mass and weight, it will be appreciated that the housing could take the form of a solid disk-like housing for smaller search coils. The housing is preferably formed from a plastic material and preferably formed from top and bottom housing halves 14a and 14b respectively, as best seen in FIG. 6, which are secured together as by cementing or ultrasonic welding in a common central plane of the housing. The housing halves may be formed in any desired manner, such as by vacuum forming or by injection molding, to produce a housing which is hollow in assembled form. The above mentioned flanged socket 12 which may also be fabricated of a plastic material, is secured to the search coil housing at the hub portion in any suitable manner such as by cementing or riveting or both. Materials which are especially suitable for the fabrication of the search coil housing are acrylonitrile butadiene styrene (ABS), acrylic coated acrylonitrile butadiene styrene, and high impact polystyrene.

The rim portion 21 of the search coil housing defines an annular chamber within which is disposed the induction coil unit 30 which is the search coil for the circuit of the detector 10. This annular chamber, as best seen in cross-section in FIG. 6, is shown as being generally rectangular in cross-section and having top and bottom walls defined by the top and bottom housing portions 24a and 24b respectively.

Upper and lower annular support pads 25a and 25b are disposed in the annular chamber adjacent to the housing top and bottom walls respectively. As shown in FIG. 6 of the drawing, these pads are generally rectangular in cross-section and generally coextensive with the width of the annular chamber; and the pads are secured within the housing chamber in any suitable manner. These pads are fabricated of a resilient cushion material which preferably is a foam rubber type material such as ethane foam rubber.

The induction coil unit 30 is made up of a plurality of turns of a continuous insulated wire 31 formed to a diameter corresponding to the diameter of the rim portion 21 of the search coil housing, with the turns of wire being encased within a sheath 32 of metallic foil such as lead foil or copper foil. The turns are completely encased in this metallic sheath 32 which is arranged on the coil to define a Faraday shield. For the purpose of forming this Faraday shield, the sheath 32 is provided with an insulation joint defined by an insulation sleeve 33 disposed on the coil unit 30 opposite from the point where the coil lead wires emerge, namely at the housing spoke 23a. This insulation joint is indicated in FIG. 2 and is illustrated in FIG. 5 wherein the telescoping ends of the sheath 32 are radially separated by the insulation sleeve 33.

The sheath 32 retains the wire turns 31 in a generally cylindrical bunch, as best seen in cross-section in FIG. 6; and the coil unit defined by the sheathed wires is retained within the annular chamber of the housing rim 21 by the support pads 25a and 25b, the confronting faces of which are spaced a part a distance less than the diameter of the coil unit. Accordingly the coil unit is supported or retained within the housing chamber by the cushioning pads in a manner to provide very light physical pressure or force on the coil unit, defining a form of floating support; yet the coil unit is retained securely in spaced relation to the walls of the housing chamber. With this cushioning type support, there will be minimal changes of pressure or force acting on the coil unit due to unequal expansion and contraction of the search coil housing and search coil unit resulting from changes in temperature. This resilient cushioning support will also accommodate any relative radial enlargement or contraction of the coil unit relative to the housing. With this type of cushion mounting of the coil unit, it has been found that false signals resulting from variations in ambient temperature are very substantially minimized.

Another factor which appears to produce false or error signals in response to temperature changes is a type of insulation which is used on the turns of wire 31. Where the insulation is of a material which has a relatively high coefficient of heat expansion and therefore significantly enlarges or contracts with changes in temperature, this apparently has the effect of changing the physical forces acting on the turns of wire within the coil unit and also of shifting the positions of the several wires in the unit to produce a false signal. Additionally, if the insulation material has a low melting point and therefore softens substantially and relatively low temperatures, this may result in shifting of wires within the coil unit. It has been discovered that when wire is used having a type of insulation which has a low coefficient of thermal expansion and whose physical characteristics do not change appreciably with extreme changes in temperature, the occurence of false signals is greatly reduced. The wire insulation then should be of a material which has a low coefficient of thermal expansion and a high resistance to heat, and materials such as tetrafluoroethylene (teflon) and asbestos are desirable for this purpose.

Referring now to the connection of the induction to the remainder of the detector circuit, one end 31a of the coil wire 31 emerges from the coil unit adjacent to the housing spoke 23a and extends radially through this hollow spoke to be joined to the central post 41 of a coaxial connector 40, which is mounted in an aperture in the top housing member 24a adjacent to its hub portion 22. The other end of the induction coil wire 31 is connected, by means of a soldered joint 35, both to a ground lead wire 36 and to the metallic sheath 32. The ground lead wire is in turn connected to the housing of the coaxial connector 40. Both of the coil lead wires 31a and 36 are enclosed by a metallic sheath 37 which is connected to the metallic sheath 32 and defines an extension of the Faraday shield through the lead wire spoke 23a. By means of a complementary coaxial connector 42 and a coaxial cable 43, the induction coil is connected to the remainder of the electrical circuitry contained in the circuit housing 13.

What has been described is a novel and improved search coil structure having features which serve to minimize or eliminate false signals which are sometimes produced by the induction coil, resulting from physical forces acting on the coil and produced by relative expansion and contraction of the search coil structural parts because of extreme variations in the ambient temperatures surrounding the search coil under conditions of use. While these novel structural features are very effective for the intended purpose, they also enable the economic production of search coils to produce an effective and useful metal detector.

While a preferred embodiment of the invention has been illustrated and described, it will be understood by those skilled in the art that changes and modifications may be resorted to without departing from the spirit and scope of the invention.

What is claimed is:

1. For use with a metal detector, a search coil structure comprising
    a flat housing defining an annular chamber having bottom and top walls;
    an induction coil, formed from a plurality of turns of insulated wire, disposed within said housing annular chamber; a sheath enclosing said induction coil turns to form an annular coil unit;
    cushioning support pads disposed within said housing chamber contiguous to the bottom and top walls respectively; said support pads confronting each other, with the confronting faces being spaced a distance less than the diameter of said sheathed coil unit; and said coil unit being supported between said pads in spaced relation to the housing chamber walls.

2. The search coil structure set forth in claim 1 said sheath being fabricated of metal foil to define a Faraday shield.

3. The search coil structure set forth in claim 1 said support pads being annular and coextensive with said chamber walls.

4. The search coil structure set forth in claim 1 said housing being formed of mating members adjoined in the plane of said annular chamber; said housing members being fabricated from a plastic material.

5. The search coil structure set forth in claim 2 said housing providing support means adjacent to the center thereof and a radial channel for enclosing the induction coil lead wires; a coaxial connector mounted on said housing radial channel adjacent to the center thereof for connection to said lead wires; and a metal foil sheath enclosing said lead wires in said radial channel.

6. The search coil structure set forth in claim 1 said housing having the form of a spoked wheel having a rim portion defining said annular chamber; and having a hub portion for securing a supporting handle.

7. The search coil structure set forth in claim 1 said support pads being fabricated of a foam rubber type material.

8. The search coil structure set forth in claim 1 said induction coil turns being formed from wire having an insulation fabricated from a material having a low coefficient of thermal expansion.

9. The search coil structure set forth in claim 1 said induction coil turns being formed from wire having insulation fabricated from a material which remains firm at ambient temperatures.

10. The search coil structure set forth in claim 1 said wire insulation being fabricated from tetrafluroethylene.

11. The search coil structure set forth in claim 1 said wire insulation being fabricated from asbestos.

* * * * *